United States Patent
Girotto

(10) Patent No.: US 11,167,647 B2
(45) Date of Patent: Nov. 9, 2021

(54) MAGNETIC SUSPENSION FOR A VEHICLE

(71) Applicant: IRONBOX S.R.L., Spresiano (IT)

(72) Inventor: Adriano Girotto, Spresiano (IT)

(73) Assignee: IRONBOX S.R.L., Spresiano (IT)

(*) Notice: Subject to any disclaimer, the term of this patent is extended or adjusted under 35 U.S.C. 154(b) by 409 days.

(21) Appl. No.: 16/307,532

(22) PCT Filed: May 4, 2017

(86) PCT No.: PCT/IB2017/052588
§ 371 (c)(1),
(2) Date: Dec. 6, 2018

(87) PCT Pub. No.: WO2017/216656
PCT Pub. Date: Dec. 21, 2017

(65) Prior Publication Data
US 2019/0143840 A1 May 16, 2019

(30) Foreign Application Priority Data
Jun. 15, 2016 (IT) .................. 102016000061720

(51) Int. Cl.
*B60L 13/04* (2006.01)

(52) U.S. Cl.
CPC ........... *B60L 13/04* (2013.01); *B60L 2200/26* (2013.01)

(58) Field of Classification Search
CPC ....... B60L 13/04; B60L 13/06; B60L 2200/26
See application file for complete search history.

(56) References Cited

U.S. PATENT DOCUMENTS

| | | | | |
|---|---|---|---|---|
| 5,343,811 A * | 9/1994 | Schuster | ................ | B61B 13/08 104/281 |
| 6,629,503 B2 * | 10/2003 | Post | ....................... | B60L 13/04 104/281 |
| 7,134,396 B2 * | 11/2006 | Ramu | .................... | B60L 13/10 105/49 |
| 9,090,167 B2 * | 7/2015 | Wamble, III | .......... | B60L 13/04 |
| 10,046,668 B2 * | 8/2018 | Wamble, III | .......... | B60L 13/10 |
| 10,899,236 B2 * | 1/2021 | Wamble, III | .......... | B60L 13/10 |
| 2005/0115454 A1 * | 6/2005 | Ramu | .................... | B60L 13/10 104/281 |
| 2015/0329010 A1 * | 11/2015 | Wamble, III | .......... | B60L 13/10 104/282 |

(Continued)

FOREIGN PATENT DOCUMENTS

| GB | 2174048 A | * 10/1986 | ............. B60L 13/04 |
|---|---|---|---|
| GB | 2174048 A | 10/1986 | |
| WO | 2013/003387 A2 | 1/2013 | |

*Primary Examiner* — Jason C Smith
(74) *Attorney, Agent, or Firm* — Mark M. Friedman

(57) ABSTRACT

A magnetic suspension system (MC1; MC2; MC3) for a vehicle (20) is described comprising:
- a rail (30) made of material reactive to a magnetic field and comprising two opposite side surfaces (R1, R2);
- a skid (50) which slides on the rail and, being substantially U-shaped, comprises two parallel arms (54) whose facing surfaces (P1, P2) delimit an empty space (G) partially occupied by the rail,
- each of the two opposed side surfaces of the rail, respectively facing one of the surfaces facing the two parallel arms,
- said skid being able to generate a magnetic field with a polar axis (Q) orthogonal to those facing surfaces.

18 Claims, 8 Drawing Sheets

(56) References Cited

U.S. PATENT DOCUMENTS

2019/0084443 A1\* 3/2019 Wamble, III ........... B60L 13/04
2019/0143840 A1\* 5/2019 Girotto ................... B60L 13/04
                                                            104/281

\* cited by examiner

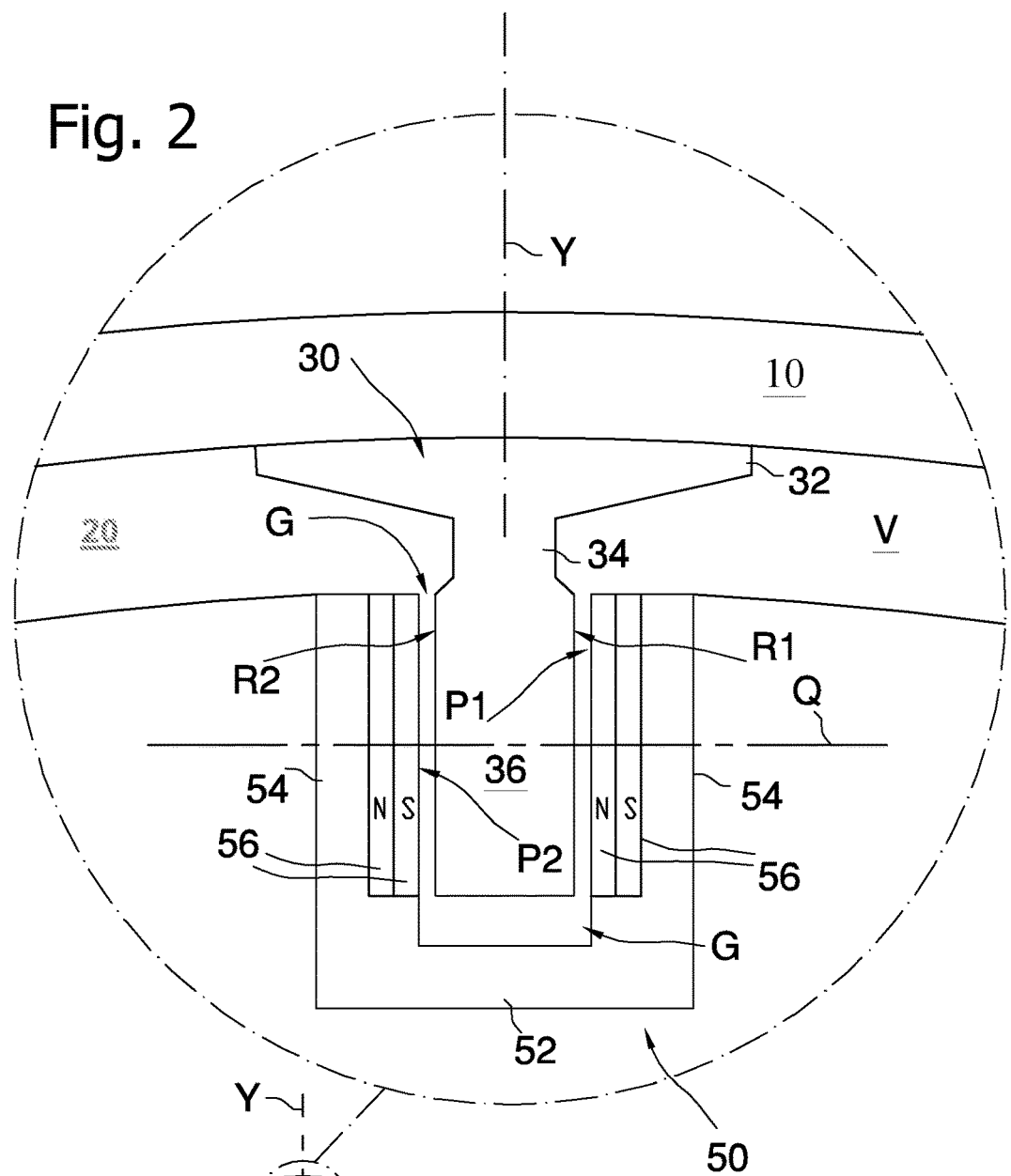
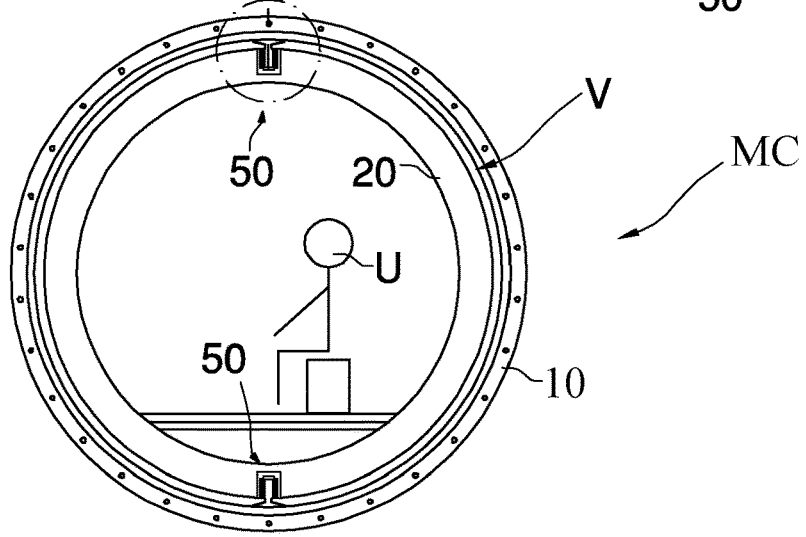

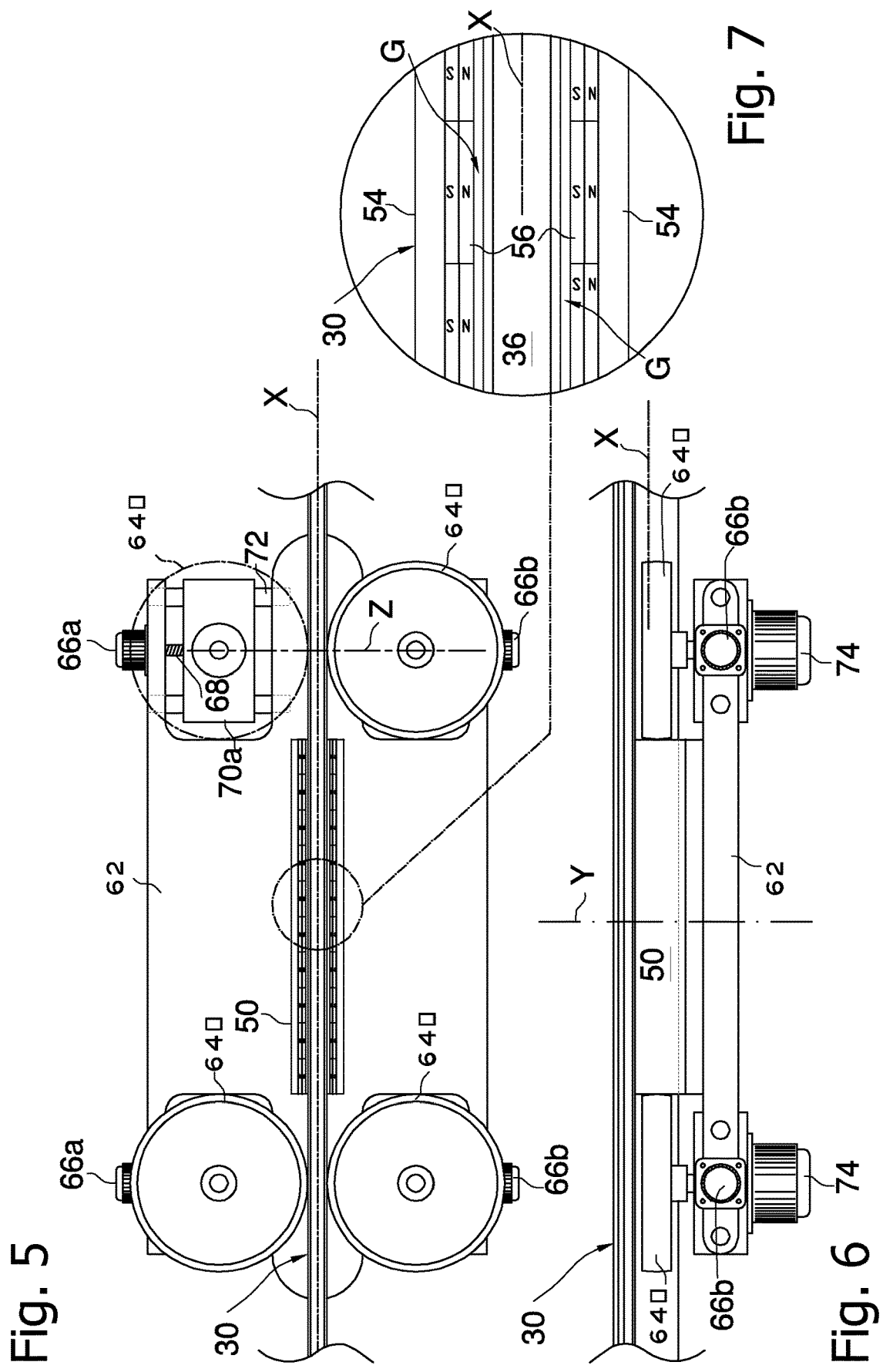

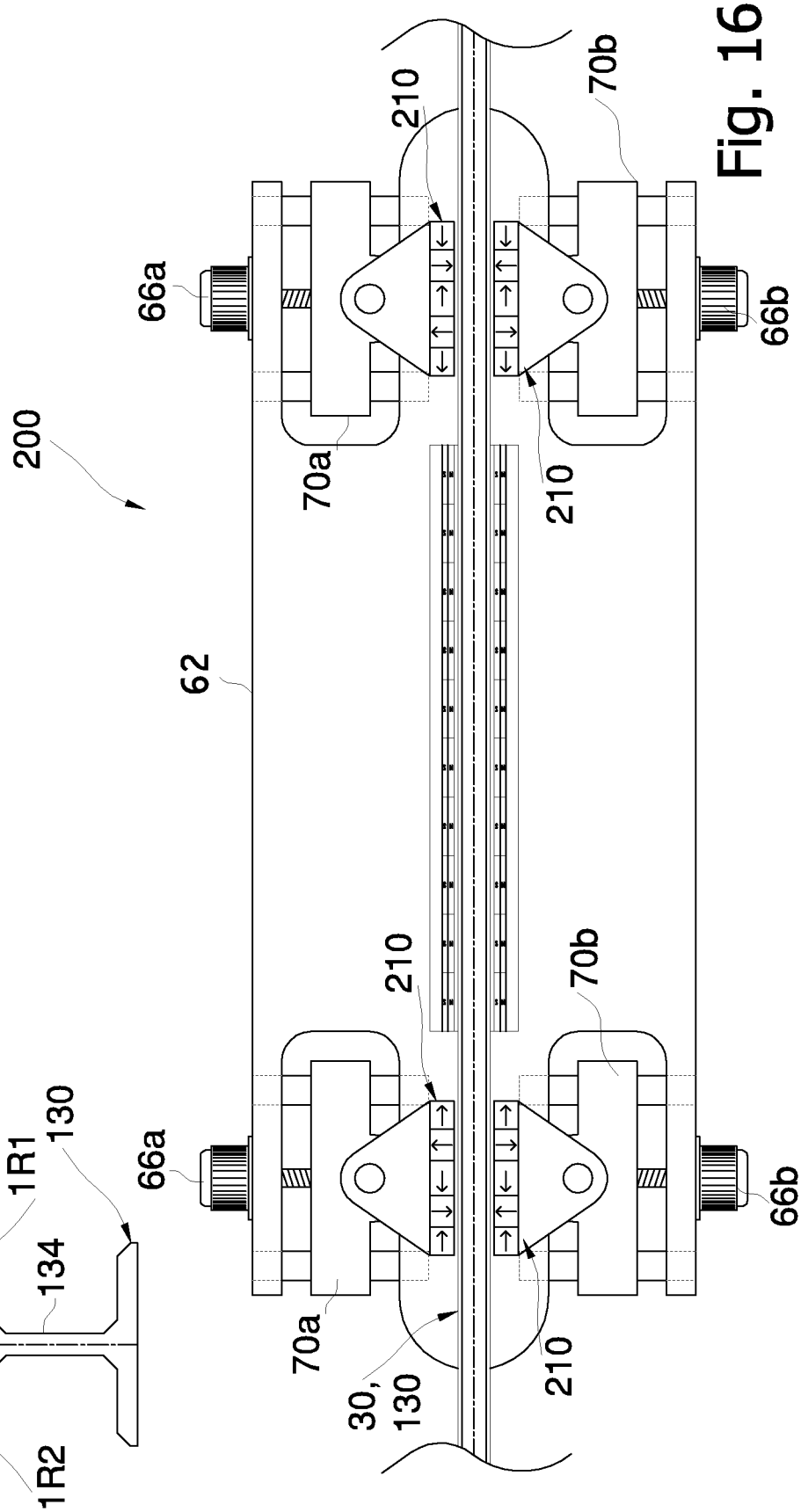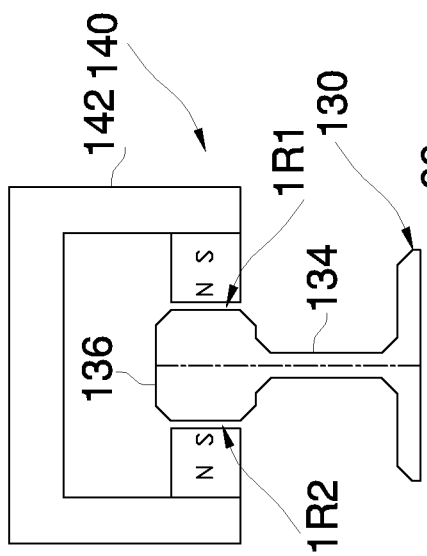

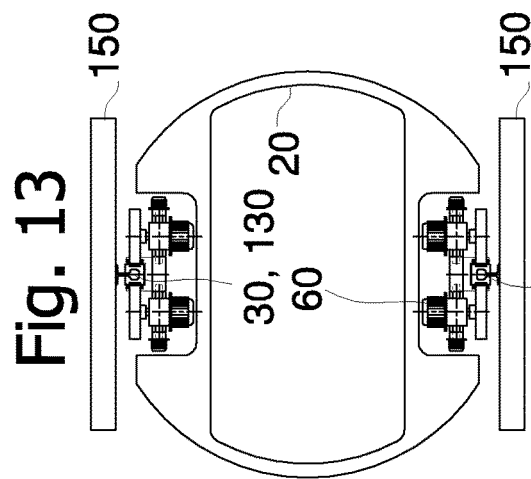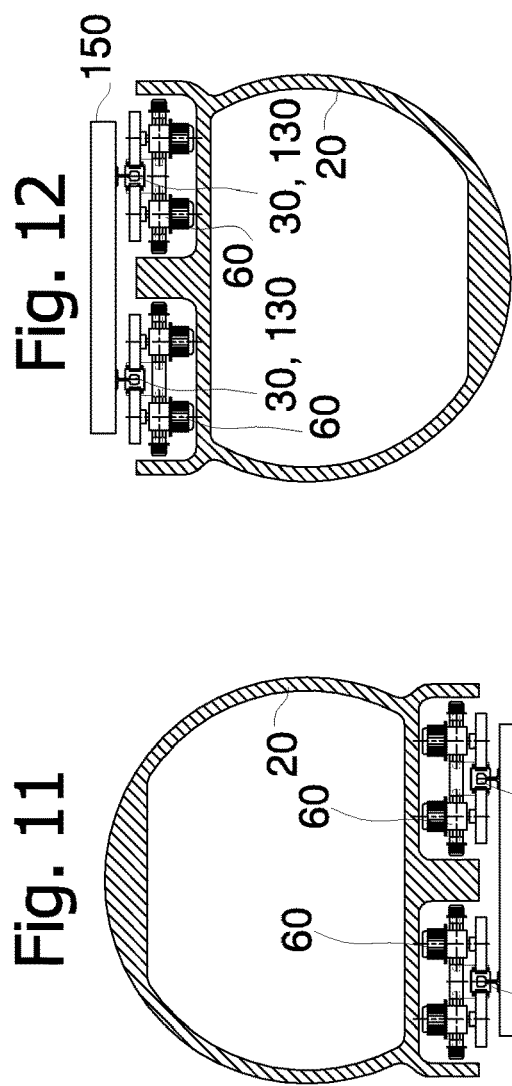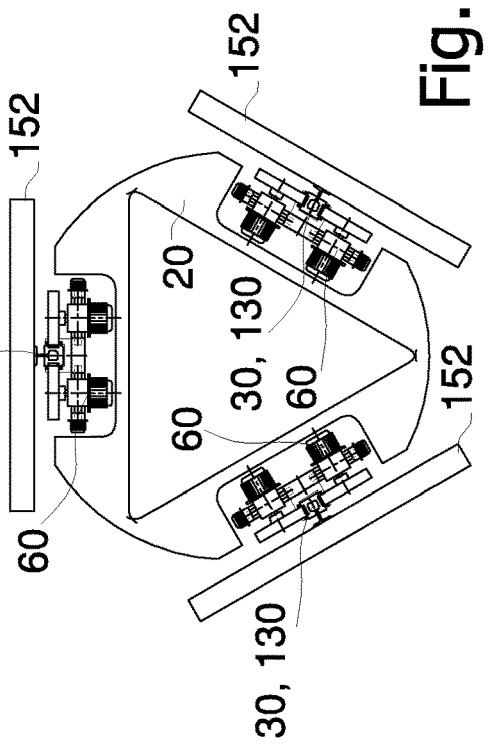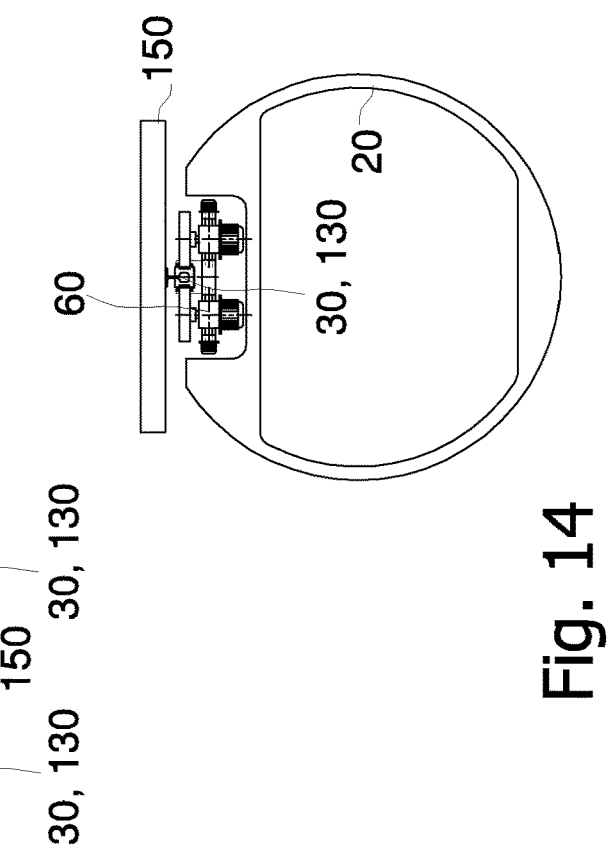

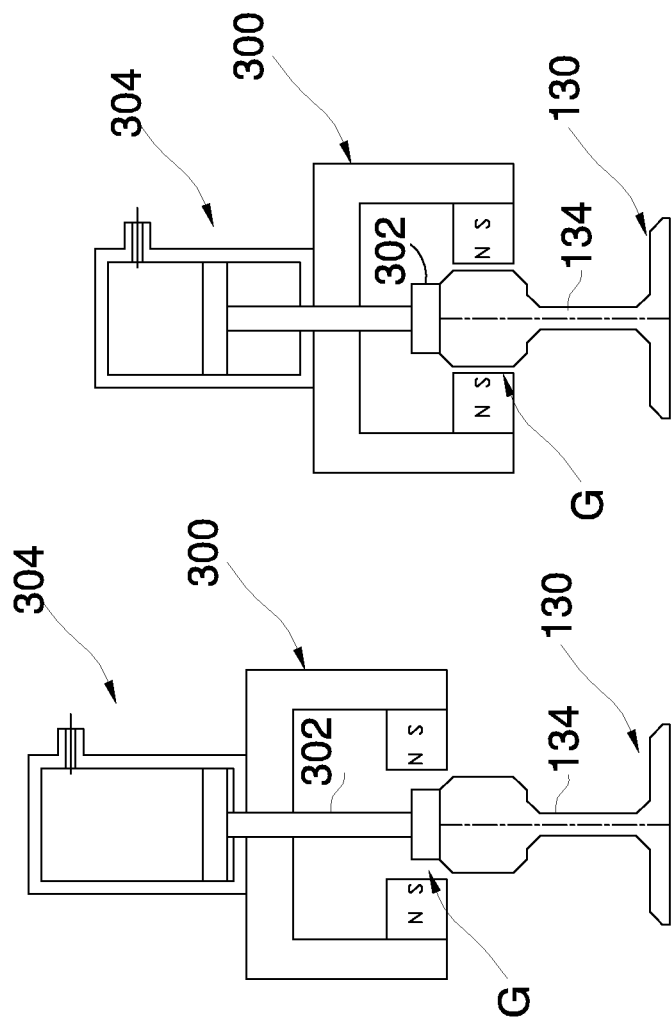

MAGNETIC SUSPENSION FOR A VEHICLE

The invention refers—generally—to a magnetic suspension for a vehicle or a passenger compartment, particularly a public transport means like a train here in the following taken as an example.

To increase the cruising speed, some trains travel off the ground via levitation systems, which can be divided into two types: compressed air systems (see U.S. Pat. No. 5,909,710) and magnetic field systems (see U.S. Pat. No. 6,664,880 or Inductrack systems). The first ones blow high pressure air under the train to form a cushion; in the second ones, magnets under the train generate eddy currents inside windings contained in the tracks, thereby inducing a supportive magnetic field. Each one of these systems has disadvantages.

Compressed air is generated by expensive, bulky turbines, and powered by a lot of energy. The windings on the tracks, too, are bulky and expensive (e.g. copper), and the magnetic cushion appears only if the train is fast enough, otherwise at low speed the latter must travel on wheels.

We then want to overcome one or more of these problems by proposing an alternative, in particular a magnetic suspension system that is inexpensive, with little energy dispersions and contained complexity. The system is defined in the attached claims, in which the dependent ones define beneficial variants.

The magnetic suspension system for a vehicle or passenger compartment comprises
  a first element comprising two opposite side surfaces;
  a second element which is slidable with respect to the first element and, being substantially U-shaped, comprises two parallel arms whose facing surfaces delimit an empty space occupied by the first element, wherein
  each of the two opposite side surfaces of the first element faces respectively one of the facing surfaces of the two parallel arms;
    a magnetic field generator for generating a magnetic field which hits and passes through said facing surfaces and said opposite side surfaces, the polar axis of the magnetic field being orthogonal to such surfaces;
  the first and second elements constituting for said generated magnetic field a closed circuit capable of generating a sufficient force to maintain the first element suspended vertically inside the empty space of the second element.

Another aspect of the invention is a magnetic suspension method for a vehicle or passenger compartment, comprising:
  slidably coupling a first element, preferably made of material responsive to a magnetic field, by inserting it inside a second element having a substantially U-shape and comprising two parallel arms delimiting an empty space for the first element,
  generating between facing surfaces (P1, P2) of the two parallel arms a magnetic field which
    has polar axis perpendicular to the facing surfaces of the first and second element, and
    hits and passes through such surfaces;
  the first and second elements constituting a closed circuit for the magnetic field capable of generating a sufficient force to maintain the first element suspended vertically inside the empty space of the second.

A preferred embodiment envisages that the system comprises
  a first element in the form of a rail comprising two opposite side surfaces;
  a second element which is slidable with respect of the rail and, being substantially U-shaped, comprises two parallel arms whose facing surfaces delimit an empty space occupied (e.g. partially) by the rail,
  each of the two opposite side surfaces of the rail facing respectively one of the facing surfaces of the two parallel arms,
    a magnetic field generator for generating a magnetic field which has polar axis orthogonal to such surfaces and hits and passes through said facing surfaces and said opposite side surfaces,
  the rail and the sliding element constituting for said generated magnetic field a closed circuit capable of generating a sufficient force to maintain the first element suspended vertically inside the empty space of the sliding element.

Another preferred embodiment envisages that the system comprises
  a rail which is made of material reactive to the generated magnetic field and which comprises two opposite side surfaces;
  a sliding element in the form of a skid which is slidable on the rail and, being substantially U-shaped, comprises two parallel arms whose facing surfaces delimit an empty space occupied (e.g. partially) by the rail,
  each of the two opposite side surfaces of the rail facing respectively one of the facing surfaces of the two parallel arms,
    said skid being capable of generating a magnetic field with polar axis perpendicular to said facing surfaces.

Preferably, in the above general definition and in the variants described in this text, the rail corresponds to the first element, and the sliding element or the skid correspond to the second element.

Preferably, the sliding element or the skid or said second element is integral with the passenger compartment or the vehicle, while the first element or the rail is integral with a support structure for the path of the passenger compartment or vehicle. However, it is possible to swap the positions.

To simplify the construction of the first element or the rail and the sliding element, it is preferable that the first element or the rail is substantially planar and the second element or the skid is U-shaped, although the reverse solution can be used.

To simplify the construction of the rail or the first element, it is preferable that the magnetic field generator is mounted or present on the sliding element or on the second element. Preferably, for constructive simplicity, the magnetic field generator comprises or consists of at least one permanent magnet or an electromagnet. Specifically, the magnetic field generator comprises or consists of permanent magnets set along and/or at the end of said parallel arms.

With a relative movement between the second element (or the sliding element or the skid) and the first element (or the rail) tending to extract the first element from the second element, said polar axis remains substantially constant and substantially orthogonal to the direction of the relative movement and to the opposite side surfaces of the first element or the rail. This allows the strength of the magnetic field exerted on the first element or on the rail to have constant or nearly constant value, and not the classic trend inversely proportional to the distance between interacting magnetic poles.

It should be noted that, for the levitation, the invention does not exploit the principle of the magnetic brake, that is, the development of eddy currents inside a conductor when a magnetic field acts on such conductor.

Said material reactive to the magnetic field may be a ferromagnetic material, e.g. and advantageously a cheap and very robust material (e.g. iron or C10 steel), or a magnetic field source, e.g. a magnet.

Preferably, the first element or the rail, seen in a cross-section plane orthogonal to the longitudinal axis of the first element or the rail (i.e. an axis parallel to the axis of traveling of the vehicle or passenger compartment), comprises a first portion at the end of which there is
a second portion whose thickness is
greater than the first portion's and
delimited by said two opposite lateral surfaces.

In this way, the magnetic field attracts the second portion to make it always stay within the space separating the facing surfaces of the two parallel arms. Therefore, the magnetic field generates a return force both when the first element or the rail is extracted from the second element and when they are pushed more inside it.

Preferably, the first portion is straight and/or of constant thickness and/or generally constituted of a core of the section.

For said material reactive to the magnetic field it is particularly useful to use low-carbon iron, or even better silicon steel with low electrical conductivity, also called magnetic steel. This avoids the effect of the magnetic brake where the magnetic field lines arrive on the opposite surfaces of the first element or the rail in front of and behind the train. At that point the first element or the rail is hit by a variable magnetic field.

An advantage of the system is to not leak or dissipate energy, being in fact passive because the generation of the sustaining force does not imply external energy consumption. The sustaining force depends on the geometry of the components and is a magnetic reaction force. Another advantage of the system is being able to use a first element or a rail made out of low quality material and without sophistication.

As a preferred, simple and robust construction, said second element or skid comprises:

a U-shaped piece of ferromagnetic material which comprises the two parallel arms,
a magnet placed at the end of each arm, where the two magnets have magnetic poles which are opposite and facing each other, and their respective polar axes are substantially
parallel to each other,
directed orthogonally to the end surface of the arms, and
preferably aligned.

The first and second elements (in particular the rail and the skid) are in a relative position so that the opposed surfaces of the first element or the rail and the facing ones of the second element or skid are two-by-two overlapping or adjacent to maximally interact magnetically and to develop a mutual attractive force.

The distance of the surfaces is here intended for example as the distance between their centers or that of the lying planes, and may vary, for example, from 1 to 20 mm.

The opposite surfaces of the first element or the rail and those of the second element or skid are preferably parallel to each other (except for a slight bending of the rail in the sections destined to a change of direction). In this way, the surfaces can enclose all or the possible maximum of the magnet's magnetic flow and thus maximize the levitation force.

The second element or skid defined above allows only the suspension of the passenger compartment or vehicle.

Another independent aspect of the invention is solving the problem of how to give the passenger compartment or vehicle traction.

Another independent aspect of the invention is solving the problem of how to ensure the correct relative positioning of the first element and the second element (or between skid and rail) in each working condition. To this goal, the system preferably comprises:

a first pair of positioning elements mounted upstream the sliding element or the skid,
a second pair of positioning elements mounted downstream the sliding element or the skid, the positioning elements of each pair being
placed in correspondence of opposite sides of the rail or the first element,
able to apply a force on each side of the rail.
independently movable along a geometrical axis which joins them and which is substantially orthogonal to the sides of the rail or the first element.

The last feature is not necessary if the positioning elements are electromagnets.

Via position control of said positioning elements one can determine the position of the first element or the rail within the second element or skid, with the advantage of relatively centering them to balance the destabilizing forces or to unbalance the magnetic forces acting sideways in the skid to compensate external forces acting on the passenger compartment or on the vehicle.

The positioning elements of each pair may be e.g.
wheels, by which to exert preferably also traction and/or braking to the passenger compartment or vehicle, and/or
compressed air cushions, and/or
electromagnets or Halbach arrays capable of generating a magnetic field with a polar axis orthogonal to the side of the rail.

The positioning elements of each pair may be e.g. mounted on a linear guide and actuated by an actuator, e.g. an electric motor.

In general, the said four positioning elements may also be controlled with a position control independent from one another. To simplify a coordinated positional control of the four positioning elements, the positioning elements of each pair can be moved only by two independent control methods, that is, they only can be moved 1. one with respect to the other, and/or
2. both with respect to the skid but remaining at fixed distance from each other.

The previous conjunction and/or at point 1 indicates that the displacements 1. and 2. are independent from each other.

The first control also allows determining the tightening force of—or the pressure exerted by—the positioning elements on the rail. The second control also allows establishing the rail position inside the U-shaped skid.

The first and/or second control can be accomplished e.g. by means of a microprocessor, preferably programmed to execute instructions that carry out the positional control methods above.

Another aspect of the invention is a positional control method for said pair of positioning elements, comprising the step of moving the two positioning elements of the pair only one with respect to the other, or with respect to the skid but by keeping them at a fixed distance from each other.

Preferably, the system comprises a movable member which is movable to occupy or clear the empty space of the second element. The main function of the movable organ is to facilitate the operations of the skid installation on the rail by occupying the skid seat to prevent an uncontrolled suction thereof by the magnetic field.

An auxiliary function of the movable member is to act as an emergency brake, if, when the vehicle is in motion, the moving member is pressed against the rail.

The movable member is moved, for example, by means of hydraulic, electric or pneumatic actuators.

To minimize the braking action of eddy currents induced in the rail by the magnetic field, preferably the rail is coated or formed by stacked plates or sintered material (e.g. ferrite). The sum of the thicknesses of the plates corresponds to the length of the rail. In particular, a or each plate embraces said second portion of the rail.

To be able to use wheels as positioning elements, e.g. metal wheels particularly useful in high speed systems to reduce fuel consumption and noise, the rail is lined with (vulcanized) rubber in a linear band in contact with the wheels. In general, the rail comprises a linear rubber band arranged on one or each side thereof.

Another aspect of the invention is a magnetic levitation vehicle comprising said levitation system.

The system's organs are preferably controlled via an electronic control unit or programmable microprocessor. By using a proper software program the control unit or the microprocessor manages the operation of the system, e.g. by detecting data from sensors and/or driving the actuators of the movable member or the actuators of the positioning elements.

The advantages of the invention will be clearer from the following description of preferred embodiments of the suspension, referring to the attached drawing in which FIG. 1 shows in a vertical cross-section a levitation system according to the invention for a passenger compartment;

FIG. 2 shows an enlargement of FIG. 1;

FIG. 5 shows a top view of the skid of FIG. 4;

FIG. 6 shows a side view of the skid of FIG. 4;

FIG. 7 shows an enlarged view of the circle of FIG. 5;

FIG. 10 shows in a lateral view a variant of a rail;

FIGS. 11-16 show lateral views of vehicle variants;

FIGS. 17 and 18 show laterally a skid variant in two different operative configurations;

In this text terms as vertical or horizontal are referred to the system as in use. In the figures:
  equal numbers indicate equal or conceptually similar parts;
  the letters N and S indicate North or South magnetic poles.

Figure 4:
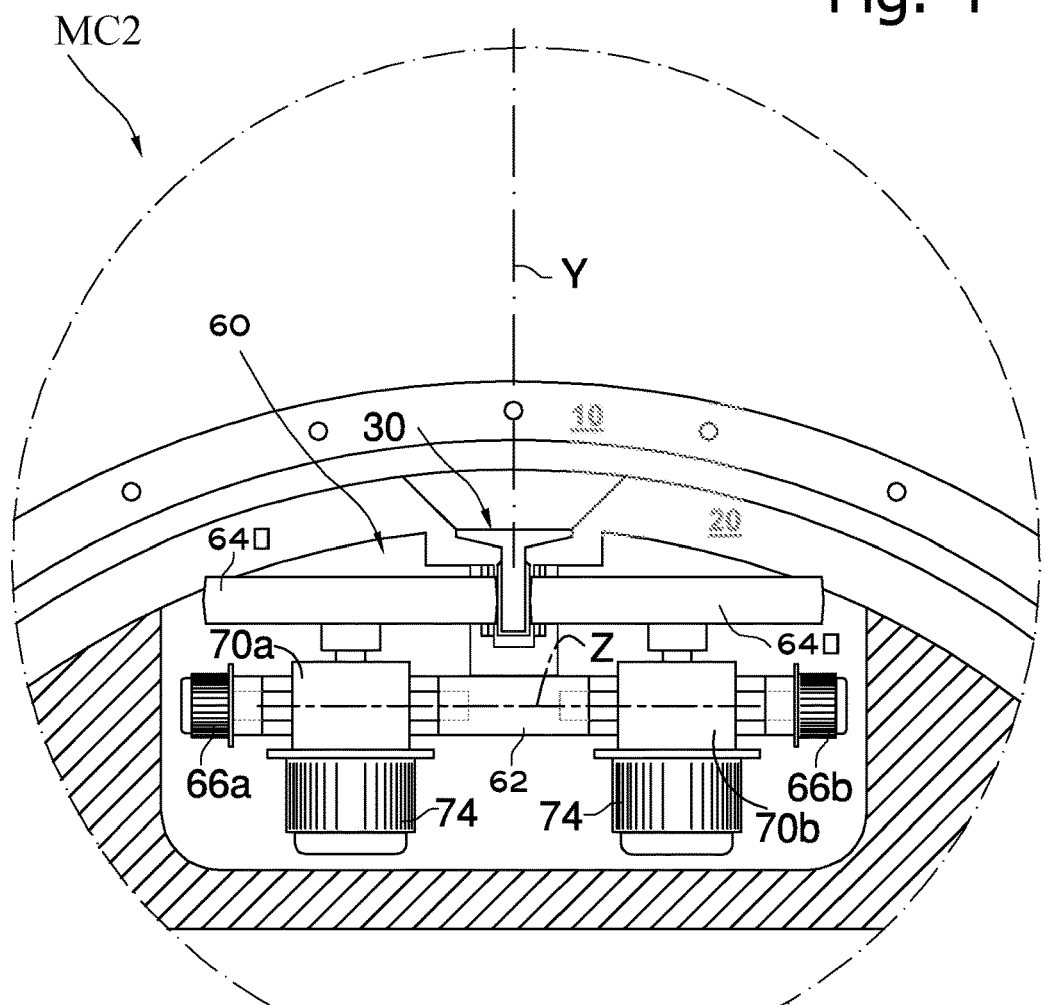
FIG. 4 shows in an enlargement of FIG. 3 a levitation skid.

A levitation system MC for carrying people or things U comprises a tubular guide or structure 10 inside which axially slides a cylindrical passenger compartment 20 of slightly lesser diameter, so that between the twos there remains a gap V.

At the top of the guide 10 is inwardly mounted a rail 30 (FIG. 2) slidably mating with a magnetic skid 50 mounted on the passenger compartment 20. The rail 30 comprises a flange 32 for mating with the guide 10 from which extends a vertical neck 34 which supports a guide head 36. The guide head 36 has substantially rectangular cross-section, therefore it comprises two major side surfaces R1, R2 which are opposed to each other.

The skid 50 is mounted in a seat of the passenger compartment 20, and has substantially U-shape. Therefore it comprises a central section 52 connecting two parallel arms 54 defining an empty space or groove G.

The head 36 occupies almost completely the groove G, which is in practice a vertical slot, in the outer surface of the passenger compartment 20, extending along a vertical axis Y.

The arms 54 comprise by construction facing surfaces P1, P2 which delimit the space or groove G, and which each consist of a magnet block 56 placed at the end of each arm 32.

The two magnets 56 have a magnetic pole facing a surface P1, P2, and the other pole facing the inside of the arm 32. The facing poles of the magnets 56 placed on opposing arms 54 are of opposite type (a pole N faces a pole S, or vice versa), and the respective polar axes are substantially parallel and coinciding with a common axis Q.

The surfaces R1, R2 of the head 36 are substantially parallel to each other and to the surfaces R1, R2 of the magnets 56. The surfaces P1, P2, too, are substantially parallel to each other.

Then, the magnets 56 generate a magnetic field between the surfaces P1, P2 along the Q axis which hits orthogonally the surfaces R1, R2, and the head 36 occupies and forms the air-gap of the corresponding magnetic circuit.

To understand the operating principle of the system MC, consider it in resting position as in FIG. 2, in which the margins of surfaces P1, P2 are horizontally aligned with the margins of surfaces R1, R2. The surfaces P1, P2 can also be partially taken off the surfaces R1, R2: the magnetic field will then make them return to the equilibrium position (as in FIG. 1). The weight of the passenger compartment 20 tends to bring the head 36 out of the space G along Y (the passenger compartment 20 would move downwardly in FIG. 2), but such relative sliding involves as reaction the generation of a magnetic suction force, which contrasts the weight force. The reaction force is almost constant as long as the surfaces R1, R2 overlap, even partially, with the surfaces P1, P2, or as long as the head 36 is at least for a segment inserted in the groove G. The same reaction force, directed always toward the center of the magnets 56 (i.e. towards the polar axis Q) develops even if the head 36 tries to get out of the groove G on the opposite side, that is, downwardly in FIG. 2. That's why the same system MC works as a supporter when symmetrically is mounted on the passenger compartment 20 in a diametrically opposite position (FIG. 1).

Note that it is the particular geometric arrangement of the polar axis Q of the magnets 56 and the sliding direction Y of the head 36 that guarantees that
  the magnetic suction reaction is constant or nearly constant as long as there is overlap between the two surfaces R1, R2 and surfaces P1, P2; and
  the magnets 56 constantly attract the head 36 along the axis Q with opposing forces, and equal in the case of symmetrical centering (symmetry axis of head 36 coincident with symmetry axis of the groove G).

By overlapping between the surfaces R1, R2 and the surfaces P1, P2 it is meant the orthogonal projection (along Q) of the first on the second with non-zero area.

Since the magnetic reaction force is proportional to the length of the skid 50, it is sufficient to size this length to create an adequate force to support any passenger compartment. FIG. 7 shows an example of succession of magnets 56 to form the skid 50 when smaller magnets are used or a high force is needed.

A general problem to be solved is how to give traction to the passenger compartment 20, in the face of the known use of linear motors that involves high costs and rails with over-sophisticated structure.

Figure 3:
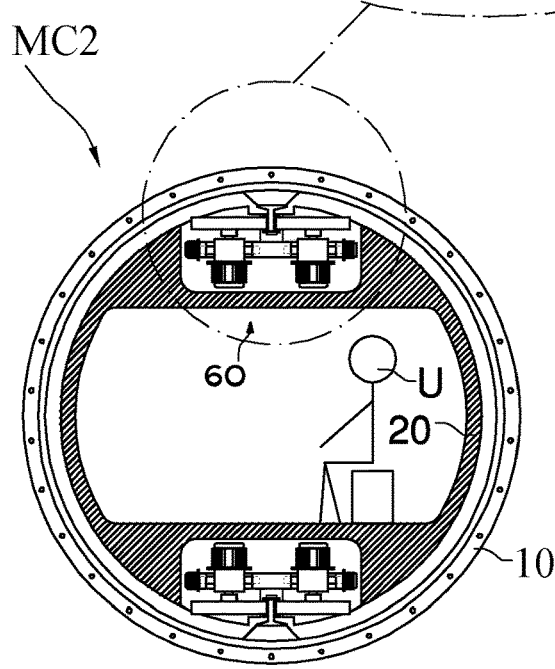
FIG. 3 shows in a vertical cross-section a second levitation system according to the invention for a passenger compartment.

FIG. 3 illustrates an example of a system MC2 with traction means 60 for the passenger compartment 20. The means 60 are best illustrated in FIGS. 4-6, where the rail 30, as an example, extends linearly along an axis X.

On a plate 62, integral with the skid 50 and the passenger compartment 20, two pairs of wheels 64a, b are mounted gripping on the head 36 of the rail 30 and rotated by motors 74. Both pairs work the same way so we will only describe one.

The wheels 64a are subjected to position control by means of two respective motors 66a, 66b. Each wheel 64a, b has a vertical rotation axis and this axis (parallel to Y) can move linearly, remaining vertical, along a horizontal axis Z, orthogonal to the plane containing the X and Y axes and parallel to the polar axis Q. In particular, each wheel 64a, b is pivoted respectively on a trolley 70a, b which is movable with respect to the plate 62 on a linear guide 72 (only some are visible in transparency in FIG. 5).

The trolley 70a of the wheel 64a is movable by motor 66a with respect to the plate 62 by means of a screw 68 engaging the plate 62 and the trolley 70a.

The trolleys 70a, b are displaceable relatively to each other by the motor 66b by means of a screw engaging the trolleys 70a, b.

A load cell is mounted on the screw 68 to indirectly detect the pressure of the wheel 64a against the rail 30.

Another bi-directional load cell is mounted on the screw driven by the motor 66b to detect the pressure exerted by the screw on the two trolleys 70a, b.

By controlling the motors 66a, b, the wheels 64a, b can be moved independently along the axis Z, i.e. away from and toward the rail 30. For this purpose there is an electronic control unit (not shown) connected to both load cells and motors 66a, b.

In particular, by controlling the motor 66b and detecting the signal of the respective load cell, one can control the relative distance of the wheels 64a, b, and hence the tightening pressure of the wheels 64a, b on the rail 30. By controlling the motor 66a and detecting the signal of the respective load cell, one can control the position of the rotation axes of the wheels 64a, b or, in other words, the position of the midpoint of the rotation axes. This allows e.g. offsetting horizontally and/or controlling the position of the head 36 inside the groove G.

The control of the tightening pressure of the wheels 64, b on the rail 30 has the advantage of reducing friction and wear of components. When the passenger compartment 20 is stationary and starts moving, the control unit is programmed to generate a greater clamping pressure for a start-up without slipping. When the passenger compartment 20 is at regime speed, the control unit is programmed to generate a minimum pressure, sufficient to unload the necessary mechanical power from the wheels 64a, b without slipping on the rail 30.

The second control (via the motor 66a) has two advantages: keeping the head 36 centered in the groove G and the compensation of centrifugal force when traveling on a curve.

When the passenger compartment 20 travels on a straight rail it is important to ensure that the head 36 does not move toward a magnet 56 but is attracted by the magnets 56 with equal and opposite forces, otherwise the unbalance in the magnetic field creates uneven lateral forces that would increase friction on one of the wheels 64a, b. Then, the control unit is programmed to position the head 36 in the center of the groove G, equidistant from the lateral magnets 56, i.e. the distances D1 and D2 are equal (FIG. 2).

When instead the passenger compartment 20 travels on a curved rail, in a pair of wheels 64a, b the one located at the inside of the curve is pushed by the centrifugal force towards the rail 30, while the other wheel gets away towards the outside. To prevent the more pressing wheel from generating more friction, the control unit is programmed to drive the motor 66a so as to move the head 36 from the equilibrium position of the straight-line case, that is, now D1< >D2. Such shift is towards the curvature center of the rail (parallel to Q and X), so that the head 36 approaches the magnets 56 which are closer to the curvature center and is attracted more by them. It is arranged that the difference in attractive force of the magnets 56 compensates the centrifugal thrust, to bring back frictions on the wheels 64a, b to a minimum.

Another example of traction and/or braking system, which does not require wheels, is achievable through a linear induction motor.

Figure 8:
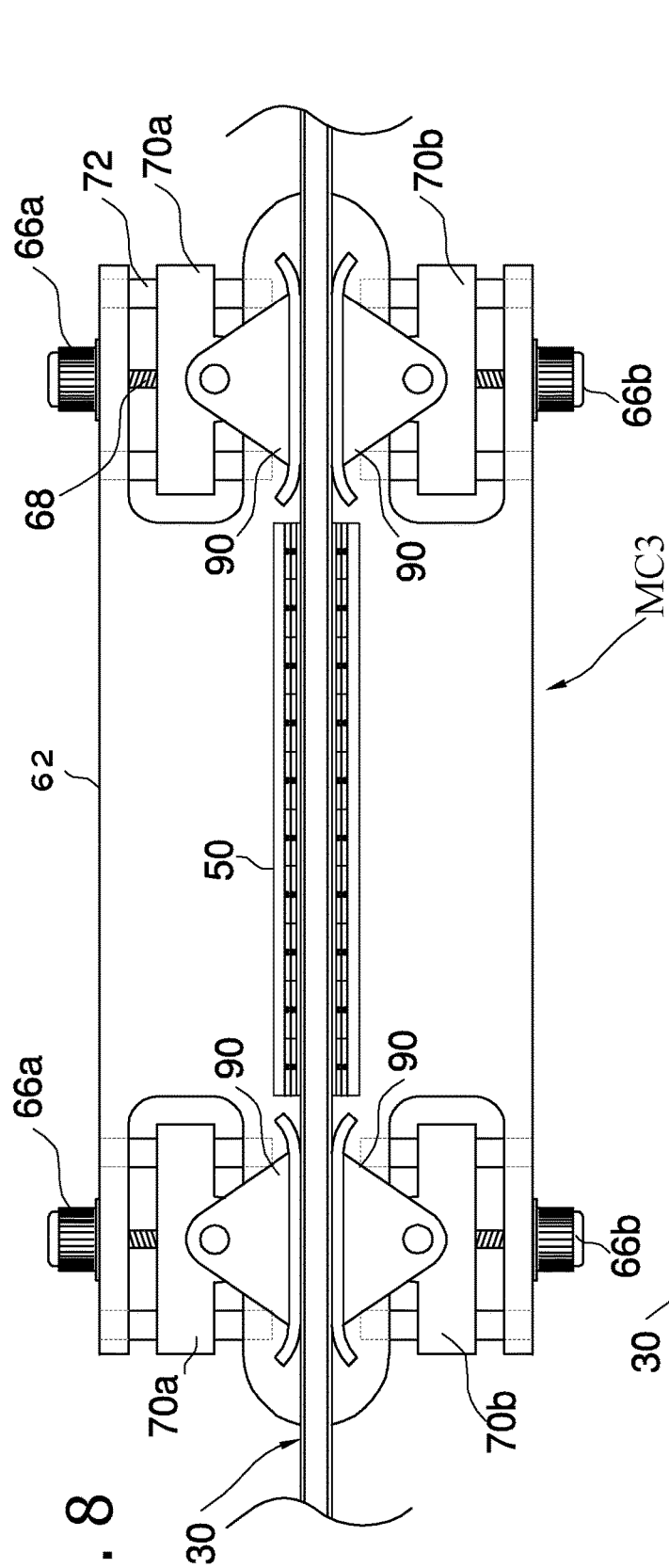
FIG. 8 shows a top view of a third levitation system according to the invention for a passenger compartment.

FIG. 8 illustrates another example of system MC3 without traction means for the passenger compartment 20, as variant of the system MC2.

Compared to the system MC2, the wheels 64a, b are replaced by pneumatic skids 90, devices capable of blowing compressed air against the rail 30. Preferably the air pressure or flow-rate is constant.

The positional control of the trolleys 70a, b is the same as the previous one, with similar advantages.

Figure 9:
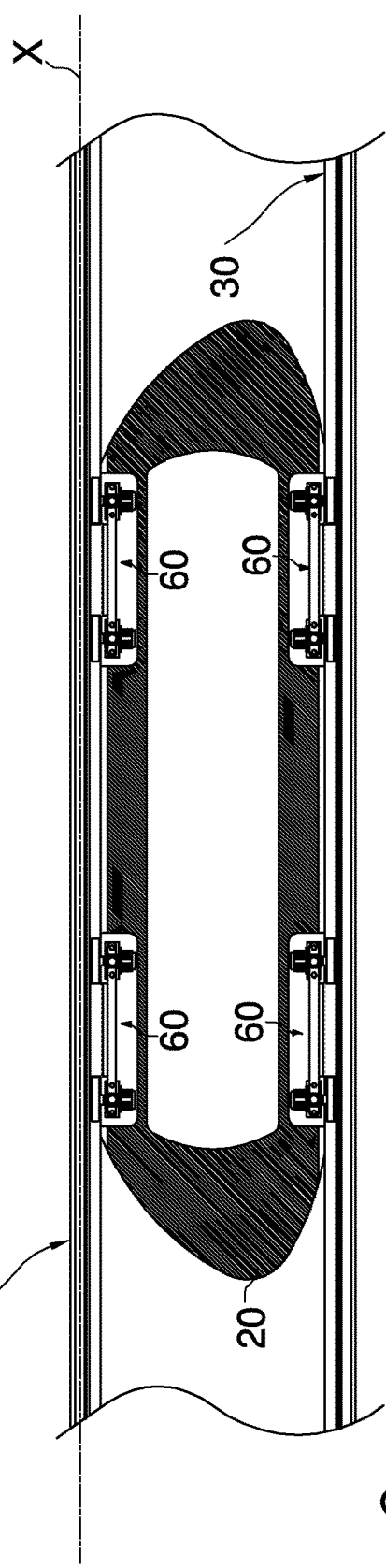
FIG. 9 shows a side view of a passenger compartment.
Figure 20:
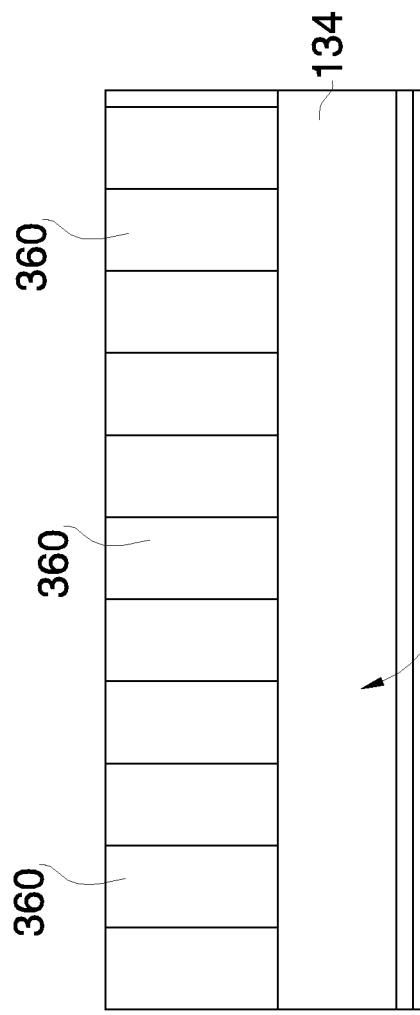
FIGS. 19 and 20 show a variant of track.
Figure 19:
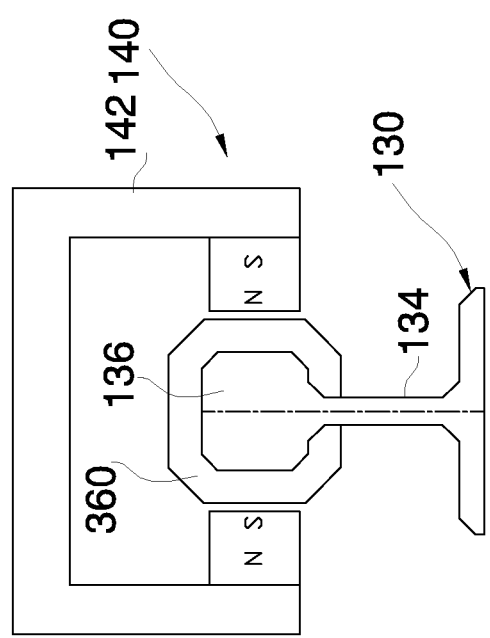

FIG. 9 shows an example of how to apply the described levitation systems to a train.

An aspect of the invention relates to the construction of the rail 30. To ensure low wear to the wheels 64a, b, and silenced movement, the rail 30 is preferably rubberized, e.g. covered with vulcanized rubber on the neck 34 or in general on a band destined to sliding of the wheels 64a, b.

The wheels 64a, b can thus be produced in material resistant to their high angular speed, while the rail 30's rubber undergoes only an instantaneous heating due to fast rolling of a wheel 64a, b.

The systems MC, MC2, MC3 envisage either only a top skid 50, 60, 90, or just a bottom one, or both for greater stability for the passenger compartment 20 (see examples of FIG. 1, 3, or 8).

With reference to FIG. 10 and following, we describe advantageous variants of the system, applicable to one or each of the variants described.

FIG. 10 shows a preferred shape for the rail 30, designated here as rail 130. The rail 130 comprises a vertical neck 134 supporting a guide head 136. The guide head 136 has cross-section greater than the neck 134's section and comprises two major lateral surfaces 1R1, 1R2 that are opposite and parallel to each other. The surfaces 1R1, 1R2 are directly facing the magnetic poles of a skid 140, here shown schematically with the N, S magnetic poles generated by a magnetic field generator and an annular part 142 to close the magnetic flux.

This geometric shape of the rail 130 allows creating a balance position for the rail 130 within the skid 140. The magnetic field between the poles N, S tends to attract the head 136 between the poles N, S so as to align the surfaces 1R1, 1R2 with such poles N, S (circuit condition with minimum magnetic reluctance). Then the rail 130 will remain centered between the poles N, S despite a tendency to pull it out of the skid 140 or push it in. It follows that with a skid 140 a load may be applied on the rail 130 both from above and from below.

Another advantage is that many existing rails for electric trains are made as in FIG. 10, so it is very easy and cost-effective to mate the magnetic skid thereto.

In FIGS. 11-15 one can appreciate some vehicle variations regarding the layout of the levitation skids.

In FIG. 11 the lower part of the passenger compartment 20 is provided with two means 60, each coupled to one corresponding lower rail 30 or 130 which rises from a dock 150.

In FIG. 12 the upper part of the passenger compartment 20 is provided with two means 60, each coupled to a respective top rail 30 or 130 extending vertically down from a dock 150.

In FIG. 13 the lower part of the passenger compartment 20 is provided with a means 60 which is coupled to a corresponding rail 30 or 130 that rises from a dock 150. In addition, the upper part of the passenger compartment 20 is provided with a means 60 coupled to a respective upper rail 30, 130 extending vertically down from a dock 150.

In FIG. 14 the upper part of the passenger compartment 20 is provided with a means 60 coupled to a respective upper rail 30, 130 extending vertically down from a dock 150.

In FIG. 15 the passenger compartment 20 is provided with three means 60, disposed as the vertexes of an equilateral triangle having the center of gravity on the longitudinal axis of the passenger compartment 20. Each means 60 is coupled to a respective rail 30 or 130 extending from a dock 150.

FIG. 16 shows a magnetic skid 200, variant of the system MC3. Here the centering system uses a known Hallbach array 210. In the array 210 as shown in FIG. 16, the direction of the arrows indicates the direction of the magnetic flux generated by the magnets. The array 210 generates a magnetic field directed towards the rail 30, 130 causing there eddy currents. Such currents generate a magnetic field opposite to that of the array 210, so that a magnetic cushion is created keeping the skid 200 distanced from the rail 30, 130.

Another variant contemplates replacing the pneumatic skids 90 of FIG. 8 with electromagnets that generate a magnetic field with a polar axis orthogonal to the rail 30, 130. The operation thus becomes analogous to that of FIG. 16, except that this time every electromagnet tends to repel the rail 30, 130.

A problem of the skid illustrated in FIG. 2 or FIG. 10 is its mounting on the rail 30, 130. Installing a-few-tons compartments on the rail 30, 130 is very difficult if you need to counteract or control the force due to the instant attraction of the magnetic field on the metallic rail.

A solution is shown in FIGS. 17 and 18.

In a magnetic skid 300, which may have any structure among those described, there is a movable element 302 (e.g. a piston) that is movable between a position (FIG. 17) in which it occupies the space G between the magnets and another position (FIG. 18) where it is far away from the space G. The moving element 302 is movable e.g., b hydraulic, electric or pneumatic actuators 304.

During the installation of the skid 300, the element 302 is moved to the first position (FIG. 17), to prevent the rail 30, 130 from being sucked in magnetically and thus allowing it to be easily positioned. After that, the element 302 is moved to the second position (FIG. 18) to make the rail 30, 130 gradually enter inside the space G.

The element 302 can also be used as an emergency brake, by pushing the element 302 against the rail 30, 130 and thereby braking by dragging.

Another problem is the parasitic currents inside the rail, which brake the motion of the passenger compartment. Particularly, when the end of a skid meets a new rail section, at that point the magnetic flux variation induces parasitic currents within the rail and an opposite magnetic field which tends to slow down the skid.

To avoid or mitigate this problem, the head 136 of the rail 130 is lined with plates 360 packed in columns, arranged in a row along the longitudinal axis X of rail 130. The blades 360 have e.g. C- or U-shape, and thickness along X a lot less than for the other two dimensions.

Or the head 136 of the rail 130 is coated with sintered material (Somalay® type), formed of metal particles covered with insulating oxide. In both cases, the free path available for the formation of parasitic currents is shrunk very much. Another option is to cover the side walls of the rail 30 in contact with the wheels 64a, b with vulcanized rubber. Thus, in the means 60, metallic wheels 64a, b can be used, particularly useful in high-speed systems to reduce fuel consumption and noise. The rubber set on the wheels 64a, b would be too stressed, while on the rail it must resist only the rapid passage of the wheels.

The invention claimed is:

1. Magnetic suspension system (MC1; MC2; MC3) for a vehicle (20) comprising:
    a first element (30) comprising two opposite side surfaces (R1, R2);
    a second element (50) which is slidable with respect to the first element and, being substantially U-shaped, comprises two parallel arms (54) whose facing surfaces (P1, P2) delimit an empty space (G) occupied by the first element, wherein
    each of the two opposite side surfaces of the first element faces respectively one of the facing surfaces of the two parallel arms;
    a magnetic field generator for generating a magnetic field which hits and passes through said facing surfaces and said opposite side surfaces, the polar axis (Q) of the magnetic field being orthogonal to such surfaces;
    the first and second elements constituting for said generated magnetic field a closed circuit capable of generating a sufficient force to maintain the first element suspended vertically inside the empty space of the second element.

2. System (MC1; MC2; MC3) according to claim 1, comprising:
    as first element a rail (30) which is made of material reactive to the generated magnetic field and which comprises two opposite side surfaces (R1, R2);
    as second element a sliding element in the form of a skid (50) which is slidable on the rail and, being substantially U-shaped, comprises two parallel arms (54) whose facing surfaces (P1, P2) delimit an empty space (G) occupied partially by the rail,
    each of the two opposite side surfaces of the rail facing respectively one of the facing surfaces of the two parallel arms,
    said skid being capable of generating a magnetic field with polar axis (Q) perpendicular to said facing surfaces.

3. System (MC1; MC2; MC3) according to claim 2, wherein the sliding element is integral with the vehicle and the rail is integral with a support structure (10) for the vehicle's path.

4. System (MC1; MC2; MC3) according to claim 2, wherein said material reactive to the magnetic field is ferromagnetic material, e.g. C10 iron or steel or low-carbon iron or low-electrical-conductivity silicon steel.

5. System (MC1; MC2; MC3) according to claim 2, wherein said sliding element (50) comprises:
- a U-shaped piece of ferromagnetic material which comprises the two parallel arms (54),
- a magnet (56) placed at the end of each arm, wherein the two magnets (56) have magnetic poles (N, S) which are facing and opposite, and their respective polar axes (Q) are substantially
- parallel to each other,
- directed orthogonally to the end surface of the arms,
- and preferably aligned.

6. System (MC1; MC2; MC3) according to claim 2, wherein the rail (130), viewed in a cross-section plane orthogonal to the longitudinal axis of the rail, comprises
- a first portion at the end of which there is
- a second portion whose thickness is
- greater than the first portion and
- delimited by said two opposite lateral surfaces (1R1; 1R2).

7. System (MC1, MC2, MC3) according to claim 2, wherein the rail (130) is coated or formed by stacked plates (360) or sintered material.

8. System (MC1, MC2, MC3) according to claim 7, wherein each plate (360) embraces said second portion (136) of the rail (130).

9. System (MC1, MC2, MC3) according claim 1, wherein the rail comprises a linear rubber band arranged on one or each side.

10. System (MC1; MC2; MC3) according to claim 1, comprising:
- a first pair of positioning elements (64a, b) mounted upstream the sliding element,
- a second pair of positioning elements (64a, b) mounted downstream the sliding element,
- the positioning elements of each pair being
- placed in correspondence of opposite sides of the rail,
- connected to the sliding element; and
- able to apply a force on each side of the rail.

11. System (MC1; MC2; MC3) according to claim 10, wherein the positioning elements of each pair are independently movable along a geometrical axis (Z) which joins them and which is substantially orthogonal to the sides of the rail.

12. System (MC2) according to claim 11, wherein said pair of positioning elements consists of two wheels (64a, b) or of two compressed-air cushions (90) or two electromagnets or two Hallbach arrays.

13. System (MC1; MC2; MC3) according to claim 10, wherein the elements (64a, b) of each pair are displaceable only according to two independent movements:
- relatively to each other along the geometrical axis (Z) which joins them together, and
- both with respect to the skid.

14. System (MC1; MC2; MC3) according to claim 10, comprising
- pressure and/or induction sensors for detecting the force by which the elements of each pair are pushed towards each other along the geometrical axis (Z) which joins them and the force by which both are pushed with respect to the skid;
- a microprocessor connected to the sensors and programmed to control the two said forces.

15. System (MC1, MC2, MC3) according to claim 10, wherein said pair of positioning elements is configured to generate a braking force for the vehicle.

16. System (MC1, MC2, MC3) according to claim 1, comprising a movable member (302) which is movable via an actuator to occupy or clear the empty space of the second element.

17. Magnetic suspension vehicle comprising the system as in claim 1.

18. Magnetic suspension method for a vehicle (20), comprising:
- slidably coupling a first element (30), preferably made of material responsive to a magnetic field, by inserting it inside a second element (50) having a substantially U-shape and comprising two parallel arms (54) delimiting an empty space for the first element,
- generating between facing surfaces (P1, P2) of the two parallel arms a magnetic field which
- has polar axis (Q) perpendicular to the facing surfaces (R1, R2) of the first and second element, and
- hits and passes through such surfaces;
- the first and second elements constituting a closed circuit for the magnetic field capable of generating a sufficient force to maintain the first element suspended vertically inside the empty space of the second.

* * * * *